US011294873B2

(12) United States Patent
Yi et al.

(10) Patent No.: US 11,294,873 B2
(45) Date of Patent: *Apr. 5, 2022

(54) QUERY-GOAL-MISSION STRUCTURES

(71) Applicant: Oath Inc., New York, NY (US)

(72) Inventors: Xing Yi, Milpitas, CA (US); Zhen Yue, Santa Clara, CA (US); Alyssa Glass Owara, Sunnyvale, CA (US); Shuguang Han, Pittsburgh, PA (US)

(73) Assignee: YAHOO ASSETS LLC, Dulles, VA (US)

( * ) Notice: Subject to any disclaimer, the term of this patent is extended or adjusted under 35 U.S.C. 154(b) by 226 days.

This patent is subject to a terminal disclaimer.

(21) Appl. No.: 16/207,761

(22) Filed: Dec. 3, 2018

(65) Prior Publication Data

US 2019/0114290 A1 Apr. 18, 2019

Related U.S. Application Data

(63) Continuation of application No. 14/984,172, filed on Dec. 30, 2015, now Pat. No. 10,146,815.

(51) Int. Cl.
| | |
|---|---|
| *G06F 16/00* | (2019.01) |
| *G06F 16/22* | (2019.01) |
| *G06N 20/00* | (2019.01) |
| *G06F 16/28* | (2019.01) |
| *G06F 16/2455* | (2019.01) |
| *G06F 16/2457* | (2019.01) |
| *G06F 16/9032* | (2019.01) |

(52) U.S. Cl.
CPC ...... *G06F 16/2228* (2019.01); *G06F 16/2455* (2019.01); *G06F 16/24575* (2019.01); *G06F 16/285* (2019.01); *G06F 16/90324* (2019.01); *G06N 20/00* (2019.01)

(58) Field of Classification Search
CPC .............. G06F 16/2228; G06F 16/285; G06F 16/2455; G06F 16/24575; G06F 16/90324; G06N 20/00
See application file for complete search history.

(56) References Cited

U.S. PATENT DOCUMENTS

2006/0173817 A1* 8/2006 Chowdhury .......... G06F 16/338
2009/0157599 A1* 6/2009 Klinkner ................ G06Q 30/02
2013/0282754 A1* 10/2013 Son ...................... G06F 16/2455
707/769

* cited by examiner

*Primary Examiner* — Hung Q Pham
(74) *Attorney, Agent, or Firm* — Cooper Legal Group LLC

(57) ABSTRACT

One or more systems and/or methods of generating a query-goal-mission structure for a set of queries are provided. A set of queries may be evaluated to identify query information for the queries within the set of queries. The queries may be evaluated as query pairs to determine common goal probabilities (e.g., likelihood two queries correspond to a particular goal, such as to identify vacation planning information) for the query pairs. Responsive to the common goal probabilities for the query pairs exceeding a goal probability threshold, the query pairs may be grouped into goal clusters. The goal clusters may be evaluated as goal cluster pairs to determine common mission probabilities. Responsive to the common mission probabilities for the goal cluster pairs exceeding a mission probability threshold, the goal clusters may be grouped into mission clusters. The mission clusters and the goal clusters may be utilized to generate a query-goal-mission structure.

20 Claims, 12 Drawing Sheets

QUERY-GOAL-MISSION STRUCTURES

CROSS REFERENCE TO RELATED APPLICATION

This application claims priority to and is a continuation of U.S. application Ser. No. 14/984,172, filed on Dec. 30, 2015, entitled "QUERY-GOAL-MISSION STRUCTURES", which is incorporated herein.

BACKGROUND

Many users may utilize search engines to perform search tasks on a regular basis to attempt to address information needs. For example, a user may provide one or more queries to a search engine in an attempt to purchase a pair of cold weather work boots (e.g., "work boot reviews," "steal toe boots," "work boot sales," "warmest boots," and/or other queries). In order to assist users with such search tasks, search engines may attempt to address information needs of the users, such as by providing users with query recommendations, etc. For example, search logs containing queries previously provided by the user may be evaluated to identify a search session and a search task associated with the search session (e.g., a session-task approach for providing query recommendations). Unfortunately, the session-task approach to satisfying information needs may have limited accuracy because of the nature and/or complexity of how users perform search tasks. For example, search users may engaged in complex and exploratory search tasks that often result in tangential search tasks being initiated (e.g., multi-tasking search behavior, such as a user providing a first set of queries associated with a first search task of researching new cars and a second set of queries associated with a second search task for purchasing cold weather work boots in a single search session). Thus, queries directed to secondary search tasks may be utilized in an attempt to satisfy the information need of users, which may create ambiguity when used to identify the initial search task. As a result of queries being incorrectly associated with a search task, users may be provided with irrelevant query recommendations and/or need to submit multiple search queries to locate desired content. Unfortunately, many computing devices and/or search engines may lack technology that can accurately classify queries submitted by users to address information needs.

SUMMARY

In accordance with the present disclosure, one or more systems and/or methods for generating a query-goal-mission structure for a set of queries are provided. In an example, a set of queries may be evaluated to identify query information (e.g., terms within the queries, a location of the terms within the query, a time a query was submitted, etc.) for the queries within the set of queries. For example, a search log (e.g., a mobile search log) may be evaluated to identify the set of queries. The queries may be evaluated as query pairs to determine common goal probabilities (e.g., likelihood two queries correspond to a particular goal) for the query pairs based upon the query information. In an example, a feature may be utilized to determine the common goal probability for the query pair. In an example, the query information may be utilized to determine the feature. The query pairs may be grouped into goal clusters based upon the common goal probabilities for the query pairs exceeding a goal probability threshold. The goal clusters may be evaluated as goal cluster pairs utilizing a mission classifier to determine common mission probabilities for the goal cluster pairs. The goal cluster pairs may be grouped into mission clusters based upon the common mission probabilities for the goal cluster pairs exceeding a mission probability threshold. A query-goal-mission structure may be generated for the set of queries based upon the goal clusters and the mission clusters.

In an example, the feature may comprise a query-pair local feature, a query-pair global feature, a query term-pair global feature, and/or a desktop query term-pair feature. In an example the query pair local feature may comprise a conxsim feature (e.g., a feature that evaluates contextual similarities of other neighboring queries). In an example, a first set of features for the query pairs may be identified. The first set of features may be utilized to determine the common goal probabilities for the query pairs. In another example, a second set of features for the goal cluster pairs may be identified. The second set of features may be utilized to determine the common mission probabilities for the goal cluster pairs. In an example, the first set of features may be different from the second set of features.

In an example, the query-goal-mission structure may be utilized to perform a search assistance task. The search assistance task may comprise identifying query recommendations, identifying event recommendations, identifying content for products and/or services, expanding a query, and/or ranking search results. In an example, a current search query may be received from a user. The current search query may be evaluated to identify a current search query aspect. The query-mission-goal structure may be utilized to identify a query recommendation for the user based upon the current search query aspect corresponding to an aspect from the query-mission-goal structure.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
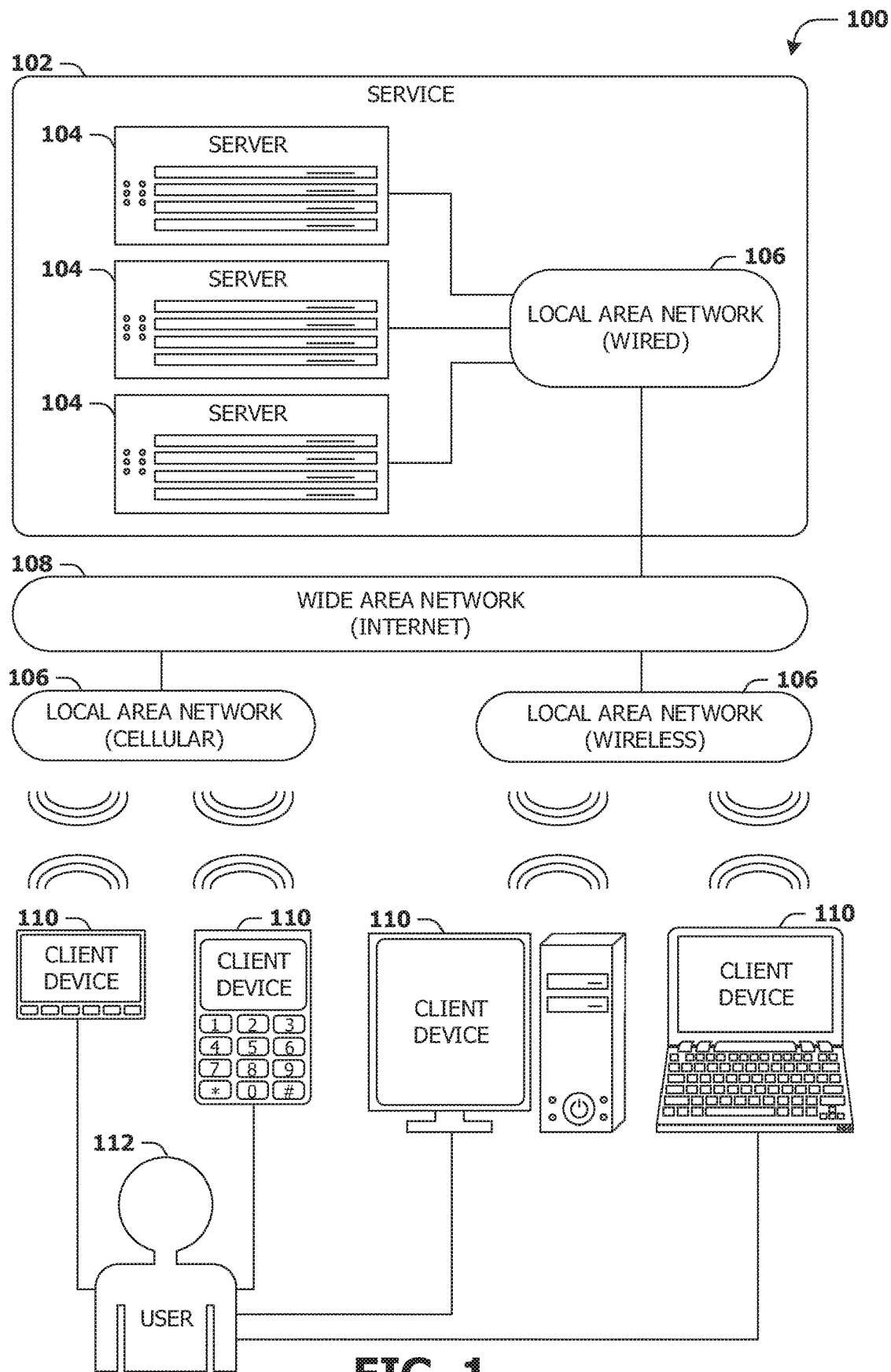
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols, and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
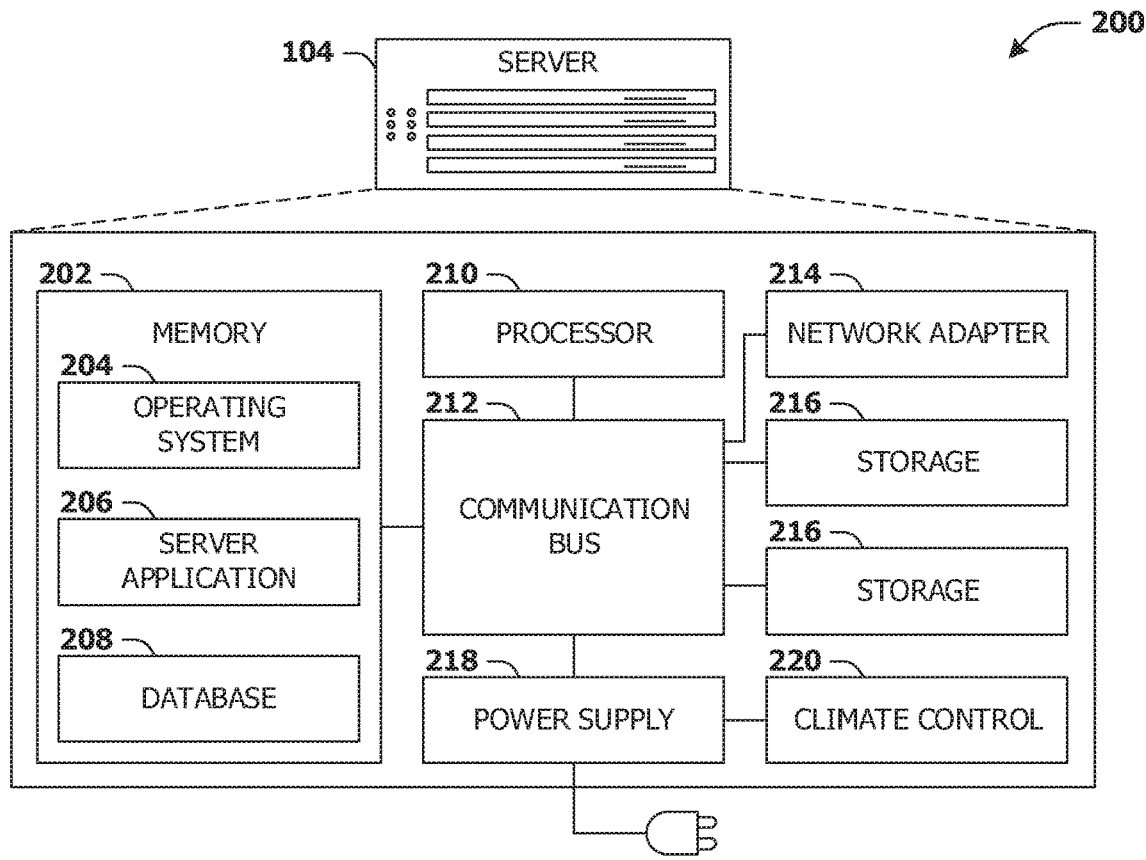
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
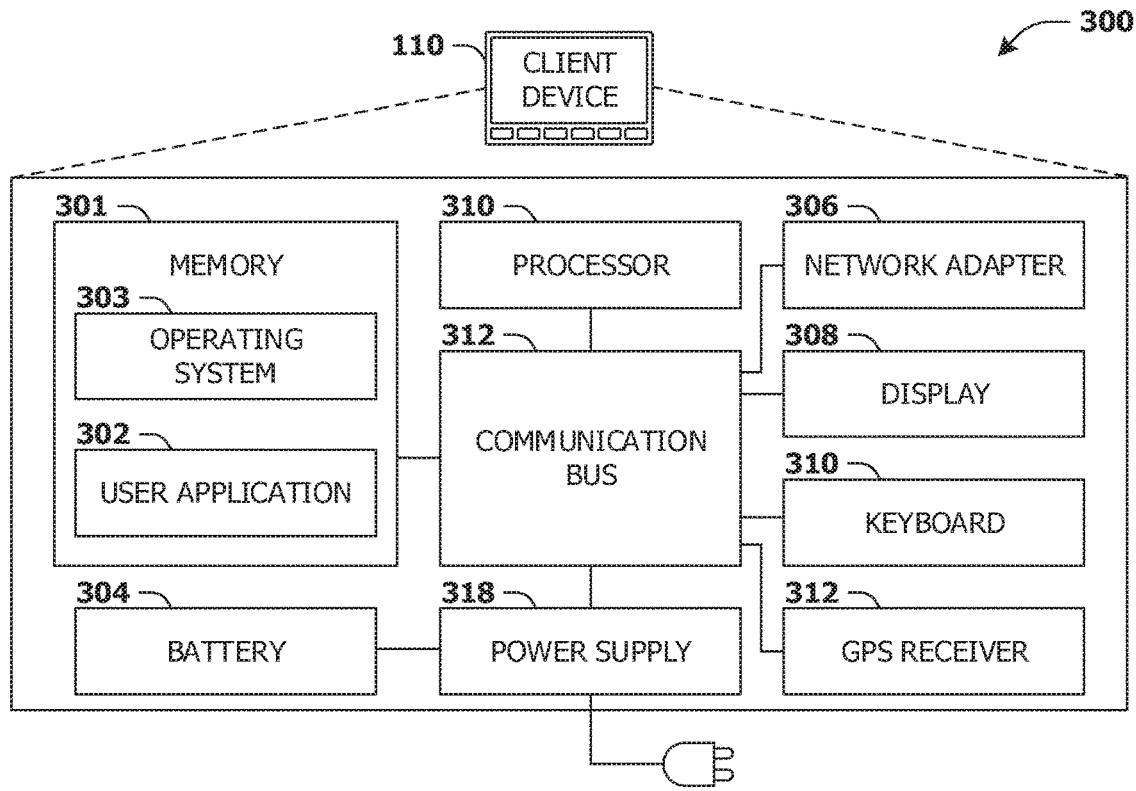
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for generating a query-goal-mission structure for a set of queries and/or utilizing the query-goal-mission structure to perform a search assistance task are provided herein. Many search engines and/or search techniques may lack a capability to evaluate search logs (e.g., mobile search logs) to accurately and efficiently locate information to satisfy an information need of a user (e.g., provide relevant query recommendations, provide improved query segment identification, frame mobile information to improve a mobile search, etc.). For example, many search engines may be unable to properly identify information needs of users from search logs that contain queries involving multi-tasking activities, which may create ambiguity when the queries correspond to different tasks, such as a task to plan a vacation and a task to buy a house. As provided herein, a classifier (e.g., a mission classifier and/or a goal classifier) may be trained to generate a query-goal-mission structure (e.g., a classification system for automatically framing information needs of a user at scale). In an example, a set of queries, such as provided to a search engine to perform a search, may be grouped into query pairs. The queries pairs may be evaluated to determine common goal probabilities for each of the query pairs (e.g., the similarity of features for the queries in the query pairs may be determined). Responsive to the common goal probabilities for the query pairs exceeding a goal probability threshold, the query pairs may be grouped into goal clusters. Subsequently, goal cluster pairs may be formed by pairing the goal clusters. The goal cluster pairs may be evaluated to determine common mission probabilities indicative of two or more goal clusters corresponding to a particular mission. Responsive to the common mission probability for the goal cluster pairs exceeding a mission probability threshold, the goal clusters may be grouped into mission clusters. The mission clusters and the goal clusters may be utilized to generate a query-goal-mission structure. In an example, the query-goal-mission structure may be utilized to perform a search assistance task.

By generating a query-goal-mission structure for a search session and utilizing the query-goal-mission structure to perform search assistance tasks (e.g., automatically expanding a search to meet an information need of the user and/or providing the user with query recommendations, etc.), a user's experience may be improved because relevant content, which may otherwise not have been included as search results, may be provided as search results (e.g., the query-goal mission structure may contain richer search results as a result of structure including cross device and/or cross session data and thus the search user may more efficiently identify search results that may otherwise have been undiscovered by the search user). Additionally, by utilizing the query-goal-mission structure, a user experience may be improved because irrelevant content, which may otherwise have been provided to the user as a result of users performing multitasking, may not be provided to the user. In an example, an operating efficiency of the user and/or a search engine may be improved by generating and/or utilizing the query-goal-mission structure. For example, the search user may more efficiently locate relevant search results by utilizing the query-goal-mission structure to provide improved search queries and/or ranked search results, which may mitigate wasted computing resources and time otherwise spent attempting to locate relevant content (e.g., reduce search engine usage traffic that results from additional searches being performed). In this way, the query-goal-mission structure may be utilized to efficiently guide a user to answers by evaluating queries from previous search sessions and providing the user with query recommendations tailored to the search task of the user. Accordingly, computing resources may be reduced, user efficiency for accomplishing a search task may be improved, and a user satisfaction may be improved.

Figure 4:
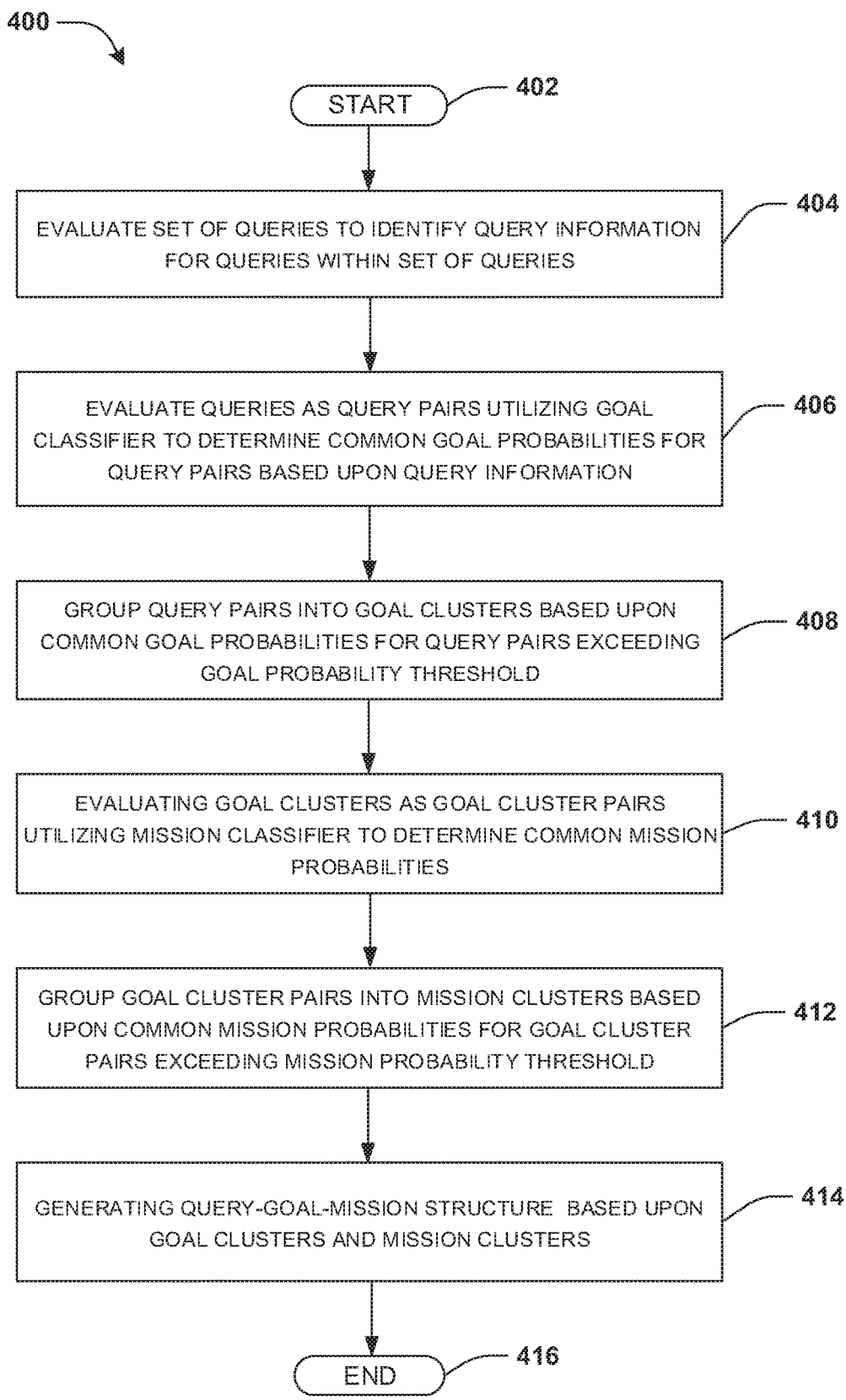
FIG. 4 is a flow chart illustrating an example method for generating a query-goal-mission for a set of queries.

An embodiment of generating a query-goal-mission structure is illustrated by an example method 400 of FIG. 4. At 402, the method 400 starts. At 404, a set of queries may be evaluated to identify query information for queries within the set of queries. The set of queries may correspond to a sequence of queries submitted to a search engine by the user in an attempt to address an information need of the user. The queries may comprise Boolean queries and/or natural language queries. The query information may be identified from search logs, browser history logs, and/or directly from the search engine. The query information may comprise query data (e.g., a list of query terms, contextual query data, input data for queryless search queries, such as selecting a content item in a smart stream, query position information, query tail length data, etc.), host data (e.g., an IP address of a device of the user), date data (e.g., a time series identification, a timestamp, a date rage for queries in the set of queries, etc.), search result data (e.g., number of search results returned to the user, number of bytes returned by the client, snippet data for the search results, etc.), user click data (e.g., a click information for a sequence of queries), document data (e.g., a list of documents previous accessed by users), and/or the like. In an example, the query information may comprise Bcookie data corresponding to an identification assigned to a device utilized to submit all or some of the queries within the set of queries (e.g., a serial number assigned based on an IP address and/or a session value of a browser utilized by a user to access a search page through the device may be used to identifying the device and/or the user). In an example, the queries may be received from various devices, such as desktop computers, mobile devices, interactive smart-displays, a smart watch, a videogame system, a wearable device, and/or the like. For example, a first query may be received from a smartphone of the user at a first time and a second query may be received from a smartwatch of the user at a second time.

In an example, the set of queries may be identified from a search session. For example, the search log may be evaluated to identify a period of time indicative of the search session. The period of time may be identified based upon an absence of periods of inactivity by the user. Put differently, a period of time when the user is regularly submitting queries may be indicative of the search session. In an example, an automated session identifier and/or a system operator may evaluate the search log to determine session boundaries for the search session (e.g., a beginning boundary and/or an end boundary of the search session). The session boundaries may be indicative of a beginning and/or an end of the period of time associated with the search session. In example, a session timeout threshold may be utilized to determine the session boundaries. For example, responsive to the session timeout threshold being 30 minutes, the beginning boundary for a first search session may be identified based upon a first query being submitted after 35 minutes of inactivity by the user (e.g., the first query may be indicative of the beginning boundary for the first search session). In another example, the end boundary for the first search session may be identified based upon a third query being submitted 2 hours after a second query (e.g., the second query may be indicative of the end boundary for the first search session). The set of queries may comprise the queries submitted within the session boundaries.

In an example, queries within the set of queries may be associated with a cross-device search session (e.g., queries corresponding to a single search session may be received from two or more devices). For example, the cross-device search session may comprise a first set of queries submitted by the user through a first device and a second set of queries submitted by the user through a second device, wherein the first set of queries and the second set of queries are submitted within the session timeout threshold (e.g., responsive to the last query in the first set of queries being submitted by the user on a laptop at 8:45 am, the first query in the second set of queries being submitted by the user on a smartphone at 8:55 am, and the session time out threshold being 30 minutes, the first set of queries and the second set of queries may be identified as belonging to a first cross-device search session). The Bcookie data, the time series identification, and/or the date may be utilized to identify the cross-device search session.

At 406, the queries may be evaluated as query pairs utilizing a goal classifier to determine common goal probabilities for the query pairs based upon the query information. In an example, the goal classifier may utilize a hierarchical clustering algorithm to evaluate the set of queries to identify the query pairs. The goal classifier may evaluate possible combinations of the queries within the set of queries to identify the query pairs (e.g., a set of queries comprising queries q1-q4 may be paired into query pairs (q1:q2), (q1:q3), (q1:q4), (q2:q3), (q2:q4), and (q3:q4)). For example, the first query (e.g., running shoes) and the second query (e.g., waterproof trail shoes) may be evaluated as a first query pair (e.g., running shoes:waterproof trail shoes) to determine a first common goal probability for the first query pair corresponding to a first goal (e.g., a relatively higher probability of corresponding to running equipment). In another example, the first query (e.g., running shoes) and a third query (e.g., Mexican restaurants) may be evaluated as a second query pair (e.g., running shoes:Mexican restaurants) to determine a second probability indicative of the second query pair corresponding to the first goal (e.g., a relatively lower probability corresponding to running equipment).

In an example, a common goal probability may be calculated for each possible query pair combination. The common goal probability may be indicative of a probability of two or more queries corresponding to the same goal (e.g., an indication of a similarity between the queries within query pairs and/or goal clusters). The common goal probability may be determined based upon the query information for the queries of the query pairs. In an example, the goal classifier may determine features for the set of queries and/or the query pairs based upon the query information. The features may be determined based upon feature functions that characterize queries on an individual and/or pair basis (e.g., query pair, cluster pair). The features may relate to a different aspect of the queries, such as a total number of queries in the set of queries, a number of search results retrieved responsive to a search query, the period of time in-between query submissions, and/or the like. In an example, the query information may be utilized to determine the feature value for the feature. The feature values for the query pairs may be compared to determine the goal probabilities. For example, each term in a particular query may be utilized as an input for computing feature values for the first query and the second query.

In an example, the features may comprise query-pair local features (e.g., Jaccard similarity of two query terms, normalized Levenshtein edit distance, a time interval, position difference, conxsim, etc.), query-pair global features (e.g., log-likelihood ratio for two queries, entropy, the entropy of rewrite probabilities from queries which can be rewritten, pointwise mutual information, pq12, such as a normalized probability that the first query is rewritten as a second query aggregated over many user sessions, etc.), query term-pair global features (e.g., term-pointwise mutual information, t-pq12, etc.), and/or desktop query term-pair features (e.g., the same as the query term-pair global features but using desktop search logs). The query term-pair global features and the query-pair global features may compute utilizing cross-session statistics. In an example, the query-pair local feature may comprise a conxsim feature. The conxsim feature may utilize contextual information and an exponential decay parameter to determine an association between the adjacent queries and/or query terms (e.g., direct associations between adjacent queries within a session and/or taxonomy-based associations between adjacent queries within a session, etc.). In an example, the conxsim feature may be indicative of a contextual similarity within an entire query session.

In an example, the goal classifier may utilize linear models with Akaike Information Criterion (AIC) to select the features utilized to determine the common goal probabilities. For example, the goal classifier may select a first set of features to determine the common goal probability for the query pairs. In this way, the first set of features may be optimized to determine the common goal probabilities based upon aspects of the set of queries being evaluated. In an example, the goal classifier may select a first feature, but not a second feature, based upon the query information (e.g., the query length, the query date, the device ID, query tail features, etc.) for the queries within the set of queries. For example, responsive to the set of queries comprising a large number of long tail query pairs (e.g., queries with a plurality of keyword phrases that may be very specific), a query term pair global feature, but not a query pair global feature (e.g., the query pair co-occurrence feature), may be utilized to determine the common goal probabilities (e.g., query term pair global features may be utilized because the query pair co-occurrence feature may return empty feature values as a result of long tail queries not being entered repeatedly by users). In this way, the goals associated with the queries may be more accurately identified as a result of the queries being more effectively grouped into goal clusters associated therewith.

In an example, feature weights for the features selected by the goal classifier may be utilized to determine the common goal probability. The goal classifier may determine the feature weights for the features based upon weighting parameters learned from training data. The feature weights may be indicative of an importance of a particular feature (e.g., the more important the feature is to determining the similarity of two queries, the greater the feature weight may be for the feature).

At 408, the query pairs may be grouped into goal clusters based upon the common goal probabilities for the query pairs exceeding a goal probability threshold. In an example, the goal clusters may correspond to goals associated with the user. The goals may correspond to an atomic information need, resulting in one or more queries. In an example, a search sequence of related queries provided by the user to accomplish a single task may be indicative of a particular goal (e.g., a goal of finding information regarding paddle-boarding on Lake Erie and distances to Lake Erie may be identified based upon the user providing a first query pair such as paddle-boarding:Lake Erie and a second query pair such as Lake Erie:Miles).

In an example, a first query pair (e.g., running shoes: waterproof trail shoes) comprising a first query (e.g., running shoes) and a second query (e.g., waterproof trail shoes) may be determine to have a first common goal probability. In another example, a second query pair (e.g., running shoes:Mexican restaurants) comprising the first query (e.g., running shoes) and a third query (e.g., Mexican restaurants) may be determined to have a second common goal probability. Responsive to the first common goal probability but not the second probability exceeding the goal probability threshold, the first query pair but not a second query pair may be grouped into a first goal cluster corresponding to the first goal.

In an example, the query pair having a largest common goal probability exceeding the goal probability threshold may be identified as a foundational query pair for the goal cluster. Responsive to identifying the foundational query pair, the goal classifier may pair the foundation query pair with other queries and/or query pairs from the set of query to generate a set of potential goal clusters. Common goal probabilities may be determined for each of the query pairs within the potential goal clusters. An average common goal probability may be determined for each potential goal cluster by averaging the common goal probabilities for each of the query pairs within the potential goal cluster. Responsive to the average common goal probability for the potential goal cluster exceeding the goal probability threshold, the potential goal cluster may be identified as the goal cluster. This process may be repeated by adding additional queries to the goal cluster until the average common goal probability does not exceed the goal probability threshold.

At 410, the goal clusters may be evaluated as goal cluster pairs utilizing a mission classifier to determine common mission probabilities for the goal cluster pairs. In an example, the mission classifier may comprise a logical regression classifier utilizing a machine-learned algorithm. The mission classifier may utilize the goal clusters, identified (e.g., outputted) by the goal classifier, as an input. In this way, the mission clusters are dependent upon the goals (e.g., two queries with different missions may not share the same goal and vice versa).

In an example, the mission classifier may pair the goal clusters into goal cluster pairs. The mission classifier may generate goal cluster pairs for all possible combinations of the goal clusters. The goal cluster pairs may be evaluated determine the common mission probability for each of the combinations of the goal cluster pairs (e.g., the goal clusters may be paired together and the probability of the goal clusters corresponding to the same mission may be determined, such as described above for determining the common goal probabilities of query pairs). In an example, the first goal cluster and a second goal cluster may be evaluated as a first goal cluster pair to determine a first common mission probability indicative of the queries within the first goal cluster and the queries within the second goal cluster corresponding to each other.

In an example, the mission classifier may identify a second set of features for the goal cluster. The second set of features may be the same and/or different than the first set of features identified for the query pairs. The second set of features may be utilized to determine the common mission probabilities for the goal clusters (e.g., a similarity of one goal cluster to another goal cluster). The second set of features may comprise features selected based upon aspects of the search queries, the goals, and/or the missions (e.g., number of queries in a particular goal cluster, time between queries, etc.). In an example, the mission classifier may utilize the Akaike Information Criterion model to select the features for the second set of features. For example, responsive to the goal clusters comprising mobile queries from a mobile search log, the mission classifier may select term-based global features to be included in the second set of features. The term-based global features may be selected to improve the classification of the goal clusters because of data sparseness issues (e.g., concern) associated with mobile search logs (e.g., search logs for mobile search may include fewer search queries because users utilize mobile device for short periods of time and/or prefer to view query results through larger more convenient interfaces, which may result in insufficient data to accurately group the goal clusters utilizing local features alone). By way of example, the desktop query term pair global features may be learned from desktop search logs containing a larger amount of queries, which may result in improved performance. Thus, responsive to the mission classifier determining that a particular mobile search log is lacking a desired amount of queries, the desktop query term pair global features may be utilized by the mission classifier to improve the efficiency of classifying the goal clusters.

At 412, the goal cluster pairs may be grouped into mission clusters based upon the common mission probabilities for the goal cluster pairs exceeding a mission probability threshold. In an example, the mission clusters may correspond to missions associated with the user. The missions may comprise a set of topically related information needs, resulting in one or more goals (e.g., a biking equipment mission may comprise a buying a bike seat goal and a buying biking pants goal; a vacation mission may comprise a book hotel goal, a car reservation goal, and a flight goal). In an example, the mission may be utilized to identify an extended information need that may be indicative of a logical extension of the goals of the user (e.g., the mission may be utilized to make the user aware of a goal that may correspond other goals that interest the user, such as a buying flight insurance goal).

In an example, the goal cluster pair having a largest common mission probability that exceeds the mission probability threshold may be identified as a foundational goal cluster pair (e.g., pair of goal clusters that are the most closely related to each other). Responsive to identifying the foundational goal cluster pair, the mission classifier may pair the foundation goal cluster pair with other goal clusters outputted by the goal classifier to generate a set of potential mission clusters (e.g., each potential mission cluster may comprise the goal clusters corresponding to the foundational goal cluster pair and an additional goal cluster outputted from the goal classifier). The mission classifier may determine the common mission probabilities for each of goal clusters within the potential mission clusters. An average common mission probability may be determined for each potential mission cluster by averaging the common mission probabilities for each of the goal clusters within the potential goal cluster. Responsive to the average common mission probability for the potential mission cluster exceeding the mission probability threshold, the potential mission cluster may be identified as the mission cluster. This process may be repeated by selecting the mission cluster with the largest common mission probability and adding an additional goal cluster to the mission cluster until a point is reached where the addition of any remaining goal clusters would result in the average common goal probability falling below the mission probability threshold.

At 414, a query-goal-mission structure may be generated for the set of queries based upon the goal clusters and the mission clusters. The query-goal-mission structure may be indicative of a hierarchical representation of aspects of an informational need of the user. The query-goal-mission structure may be utilized to frame a search need of the user by determining a relationship between previously classified goals and/or missions and a current search task (e.g., queries submitted in response to a search need). In an example, a search task may be performed utilizing the query-goal-mission structure. The search task may comprise a search satisfaction task (e.g., utilizing the query-goal-mission structure for determining user satisfaction with a search), a search optimization task (e.g., utilizing query-goal-mission structure to optimize a search ranking model, etc.), or a search assistance task. In an example, the search assistance task may comprise identifying query recommendations, identifying event recommendations, identifying content for products and/or services, expanding a query, and/or ranking search results. In an example, the query-goal-mission structure may be utilized to provide navigation support (e.g., web based navigation support) to the user.

In an example, the query-goal-mission structure may be utilized to rank search query results identified by a search engine for a current search query (e.g., a query submitted by a user in real-time and/or near real-time, such as from a live data stream). The query-goal-mission structure may be utilized to identify a goal and/or a mission associated with the current search query. Responsive to the search engine identifying the search query results for the current search query, similarity scores indicative of similarity between the search query results and the goal and/or the mission associated with the current search query may be determined. In an example, the similarity score may be determined based upon URLs, webpage titles, webpage previews, webpage metadata, and/or the like associated with the search query results (e.g., the title of a webpage corresponding to a search query result may be evaluated using the goal classifier and/or the mission classifier to determine the similarity score for the search query result). In an example, a result within the search query results may be assigned a ranking weight based upon the probability of the result being associated with the goal and/or the mission. The search query results may be ranked based upon the weight and/or the similarity score. In this way, users may be provided with relevant search results in an efficient manner (e.g., results most likely to be relevant may be displayed at the top of the results list or at another prominent location). Accordingly, users may expend less time and/or computing resources by reducing a number of irrelevant search query results that the user may review while attempting to locate relevant content.

In an example, the query-goal-mission structure may be utilized to determine a size for search sessions based upon search patterns of a particular user. The query-goal-mission structure may be utilized to determine an updated timeout period for the search session based upon search patterns identified from the search logs of the particular user. For example, a relevance of queries located near the beginning boundary of the search sessions and/or the ending boundary of the search sessions to a particular goal and/or a particular mission may be evaluated to determine whether the session timeout period should be increased or decreased (e.g., responsive to a lack of queries, submitted near the end boundary, being clustered into a goal cluster and/or a mission cluster, the search session timeout period may be reduced). In this way, a number of queries that are processed by the goal classifier and/or the mission classifier may be reduced thus reducing the computing resources expended. In an example, a first updated time out period may be determined for a first device and a second updated timeout period may be determined for a second device based upon search logs associated with the first device and the second device (e.g., the search log for a mobile search may indicate that mobile searches performed by the user last an average of 5 minutes, whereas the search log for a desktop search may indicate that desktop searches performed by the user last an average of 10 minutes). In this way, the identification of the search sessions for the particular user may be optimized based upon the search patterns of the particular user with a particular device.

In an example, the query-goal-mission structure may be utilized to identify search query recommendations for the user. For example, an aspect of the current search query may be identified (e.g., a query term, a time of day the query was submitted, a day of the week the query was submitted, the type of device used to submit the query, etc.). The goal classifier and/or the mission classifier may evaluate the aspect to identify goals and/or missions associated with the aspect of the current search query. Queries and/or query terms corresponding to the goals and/or the missions associated with the aspect of the current search query may be provide to the user as query recommendations. In another example, the query-goal-mission structure may be utilized to proactively (e.g., before the user enters a search query, such as in response to the user initiating access to a search engine) provide search query recommendations to the user based upon a context of a user, such as a location of the user, a time of day, a day of the week, and/or the like. For example, the query-goal-mission structure for the user may be evaluated to determine search patterns for the user. The search patterns for the user may be utilized to provide queryless recommendations to the user based upon the search patterns (e.g., the query-goal-mission structure for a particular user may indicate that the user regularly search for a particular stock price on weekday morning, thus search query recommendations associated with the particular stock may be recommended proactively to the particular user on weekday mornings). In an example, the query-goal-mission structure for the user may be evaluated to determine that the user checks football injury reports on Thursday nights during football season when the user arrives home from work. Responsive to the user arriving home from work on Thursdays during football season, queryless recommendations associated with a football injury goal may be provided to the user.

In an example, the query-goal-mission structure may be utilized to identify other recommendations for the user (e.g., event recommendations, activity recommendations, business recommendations, social media recommendations, etc.). The recommendations may correspond to a real-time information need of a user (e.g., the query-goal-mission structure may be utilized in real-time to identify secondary goals and/or secondary missions associated with the user and subsequently provide recommendations based upon the secondary goals and/or secondary missions). In an example, the recommendations may be provided in response to a user interaction with a device (e.g., the user may dial a phone number of a ski resort, the user may utilize a mobile application to schedule an oil change, etc.). An element of the user interaction may be evaluated to determine the recommendation (e.g., the number dialed by the user may be evaluated to determine information corresponding thereto, such as a business associated with the phone number, a location associated with the phone number, an event and/or a time of an event associated with information inputted into a mobile application, etc.). The goal classifier and/or the mission classifier may evaluate the element to identify a goal and/or a mission associated with the element (e.g., a ski house reservation goal, a ski trip mission, etc.). The query-goal-mission structure may be utilized to identify secondary goals and/or secondary missions for the user based upon the element (e.g., buying ski equipment, finding out ski conditions for a location of the ski resort, etc.). The secondary goals and/or the secondary missions identified may be utilized to provide the user with recommendations (e.g., responsive to identifying a buying ski equipment goal, a recommendation for a ski equipment shop near the current location of the user may be provided). In an example, the recommendation may comprise web page recommendations (e.g., a ski equipment review webpage), event recommendations (e.g., a concert taking place near the ski resort), product recommendations (e.g., content for ski goggles), service provider recommendations (e.g., car services, catering services, etc.), and/or the like.

In an example, the goal classifier and/or the mission classifier may comprise a regression model, such as with 10-fold cross validation. In another example, the goal classifier and/or the mission classifier may utilize a shrinkage and selection model for linear regression, such as a least absolute shrinkage and selection operator model (e.g., the shrinkage and selection models may be utilized to automatically select features).

In an example, a ground-truth labeling process may be used to train the goal classifier and/or the mission classifier. For example, a training dataset from the search log may be built by human labeling (e.g., a systems operator may manual label features, goals, missions, etc. for queries in the training dataset). The goal classifier and/or the mission classifier may be trained on the training dataset using a machine learning technique (e.g., such as described by method 700 below). In an example, a second training dataset may be utilized for cross-validation (e.g., the cross-validation may be utilized to test the performance of different features in the classification of queries into goals and/or missions). The cross-validation may be utilized to tune the goal classifier and/or the mission classifier (e.g., the probability threshold may be adjusted to improve the performance of the classifiers, such as by setting a lower threshold for including a query pair in a cluster and/or setting a higher threshold for including the query pair in the cluster).

In an example, content, such as for a product and/or service may be may be identified based upon the query-goal-mission structure. The content may be provided to the user in a content display area of a web browser and/or a mobile application (e.g., the content may be proved in a banner area of a webpage, a popup web browser window, and/or the like). In another example, an event, such as a social event (e.g., a concert, a party, a sporting event, etc.), a professional event (e.g., a conference, a meeting, licensing registration deadline, etc.), and/or a holiday may be identified utilizing the query-goal-mission structure. A calendar entry request and/or a reminder request may be provided to the user. Responsive to the user confirming the calendar entry request, a calendar entry may be created in a calendar associated with the user. By performing a search assistance task utilizing the query-goal-mission structure, an overall user search experience may be improved because the search results may comprise relevant content that otherwise may not have been identified. At 412, the method 400 ends.

Figure 5A:
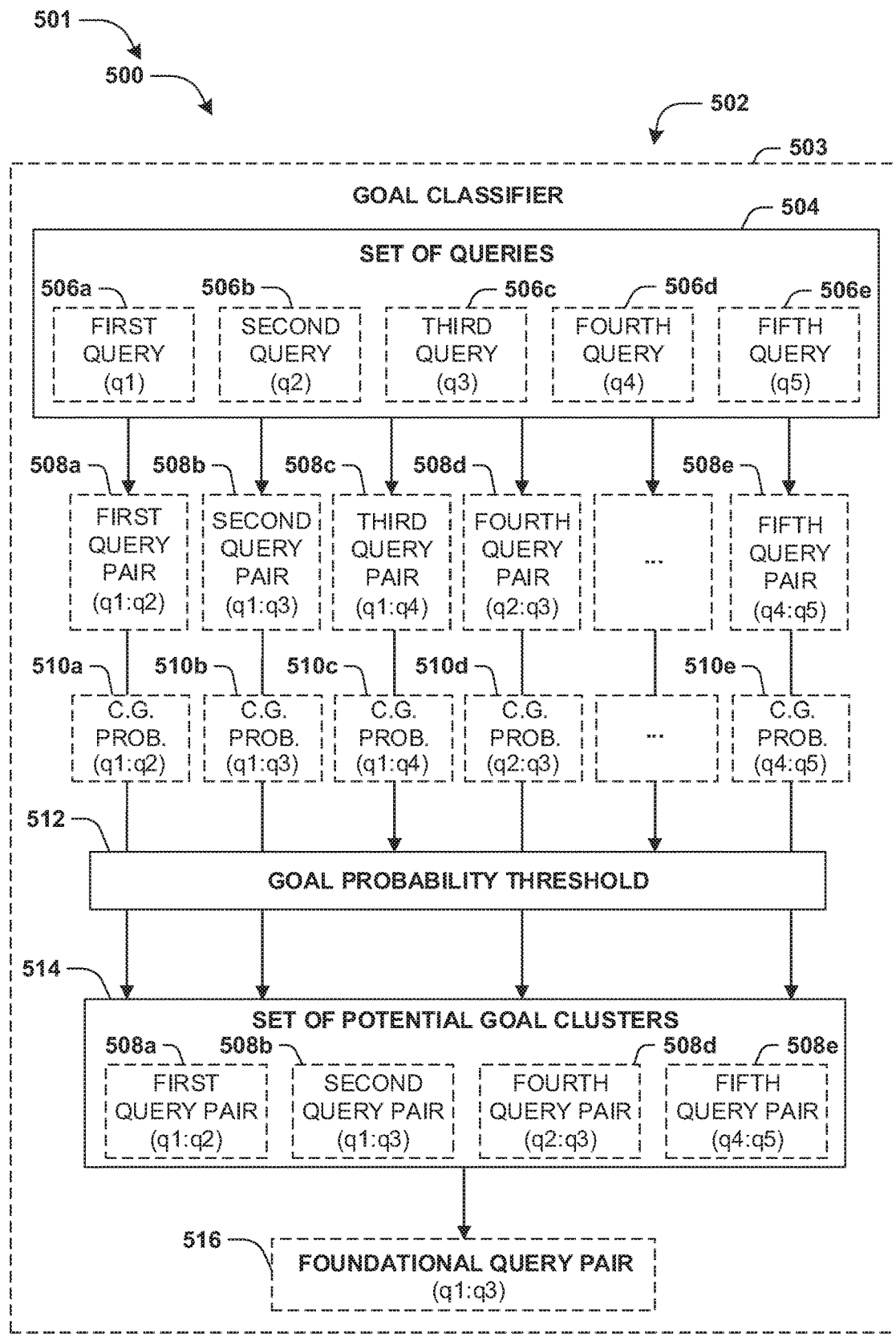
FIG. 5A is a component block diagram illustrating an example system for generating a query-goal-mission structure, where a foundational query pair is identified.

FIGS. 5A-5E illustrate examples of a system 500 where a query-goal-mission structure is generated for a set of queries 504. In an example, the system 500 may comprise a clustering component 502 configured to cluster the set of queries 504 into goal clusters and mission clusters. The clustering component 502 may comprise a goal classifier and/or a mission classifier that utilize a machine-learned algorithm. FIG. 5A illustrates an example 501 where the clustering component 502 utilizes a goal classifier 503 to determine a foundational query pair 516. The classifier 503 may be utilized to group queries 506a-506e into query pairs 508a-508e. The goal classifier 503 may evaluate the query pairs 508a-508e to determine common goal probabilities 510a-510e for the query pairs 508a-508e. The clustering component 502 may be configured to utilize the goal classifier 503 to evaluate the common goal probabilities 510a-510e to determine a similarity between the queries within each query pair 508a-508e.

Figure 5B:
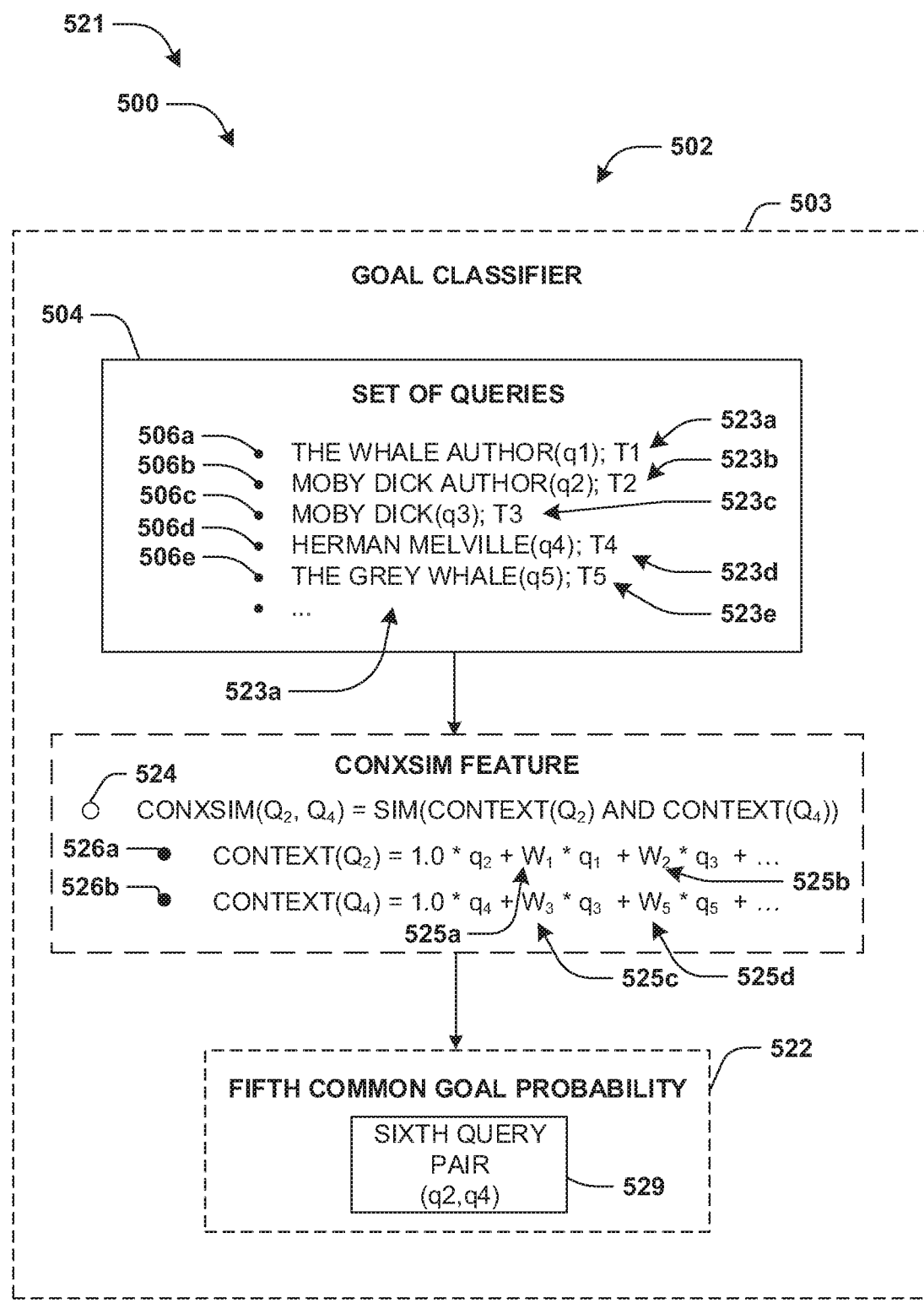
FIG. 5B is a component block diagram illustrating an example system for generating a query-goal-mission structure, where a feature is utilized to determine a common goal probability.

FIG. 5B illustrates an example 521 where the clustering component 502 utilizes the goal classifier 503 to determine a fifth common goal probability 522 for a sixth query pair 529 based upon conxsim features 524. The conxsim feature 524 may be indicative of a contextual similarity for two queries, such as the second query 506b and a fourth query 506d of the set of queries 504 by considering nearby search queries. In an example, a first context 526a for the second query 506b and a second context 526b for the fourth query 506d may be determined by the goal classifier 503. The first context 526a and the second context 526b may be evaluated to determine a context similarity for the sixth query pair 529. In an example, the first context 526a (e.g., CONTEXT(q2)) and/or the second context 526b (e.g., CONTEXT (q4)) may be determined based upon time parameters 525a-525d (e.g., the time parameters 525a-525d may correspond to a difference between times 523a-523e, such as a period of time between queries 506a-506e, and an exponential decay parameter). In an example, the conxsim feature 524 for the fifth common goal probability 522 may be determined based upon query terms associated with the queries 506a-506e with in the set of queries 504 and the time parameters 525a-525d.

In an example, responsive to the common goal probabilities 510a-510b and 510d-510e, but not 510c, exceeding a common goal probability threshold 512, the query pairs 508a-508b and 508d-508e, but not 508c, may be grouped into a set of potential goal clusters 514, as illustrated in FIG. 5A. Each of the query pairs 508a-508b and 508d-508e within the set of potential goal clusters 514 may comprise queries associated with a common goal. The clustering component 502 may utilize the goal classifier 503 to evaluate the set of potential goal clusters 514 to identify the foundational query pair 516. Responsive to the second common goal probability 510b for the second query pair 508b being larger than the other common goal probabilities 510a, 510d, and 510e for query pairs 508a, 508d, and 508e within the set of potential goal clusters 514, the second query pair 508b may be utilized as the foundational query pair 516 (e.g., the foundational query pair 516 may be the query pair most likely to contain two queries associated with the same goal).

Figure 5C:
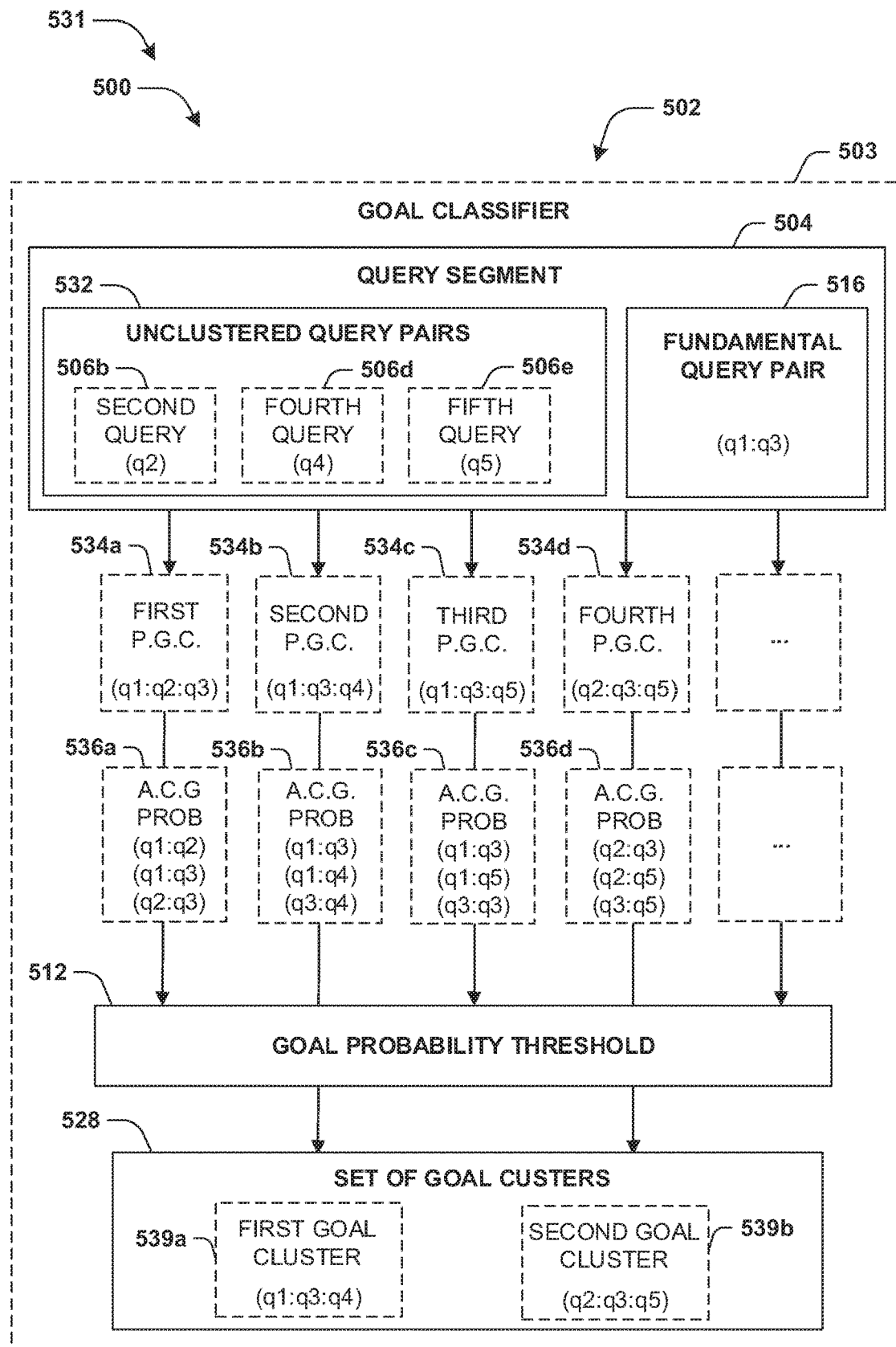
FIG. 5C is a component block diagram illustrating an example system for generating a query-goal-mission structure, where a set of goal clusters are identified.

FIG. 5C illustrates an example 531 where a set of goal clusters 528 may be identified. In an example, the clustering component 502 may utilize the goal classifier 503 to group the fundamental query pair 516 with each of the queries (e.g., queries 506b, 506d, and 506e) within a set of unclustered query pairs 532 to form possible goal clusters 534a-534d. In an example, the mission classifier 503 may be utilized to determine average common goal probabilities 536a-536d for the possible goal clusters 534a-534d. Responsive to the average common goal probabilities 536b-536d for the second possible goal cluster 534b and the fourth possible goal cluster 534d exceeding the goal probability threshold 512, the second possible goal cluster 534b and the fourth possible goal cluster 534d may be identified goal clusters 539a-539b. In an example the, second possible goal cluster 534b and the fourth possible goal cluster 534d may be outputted by the goal classifier 503 as the set of goal clusters 528.

Figure 5D:
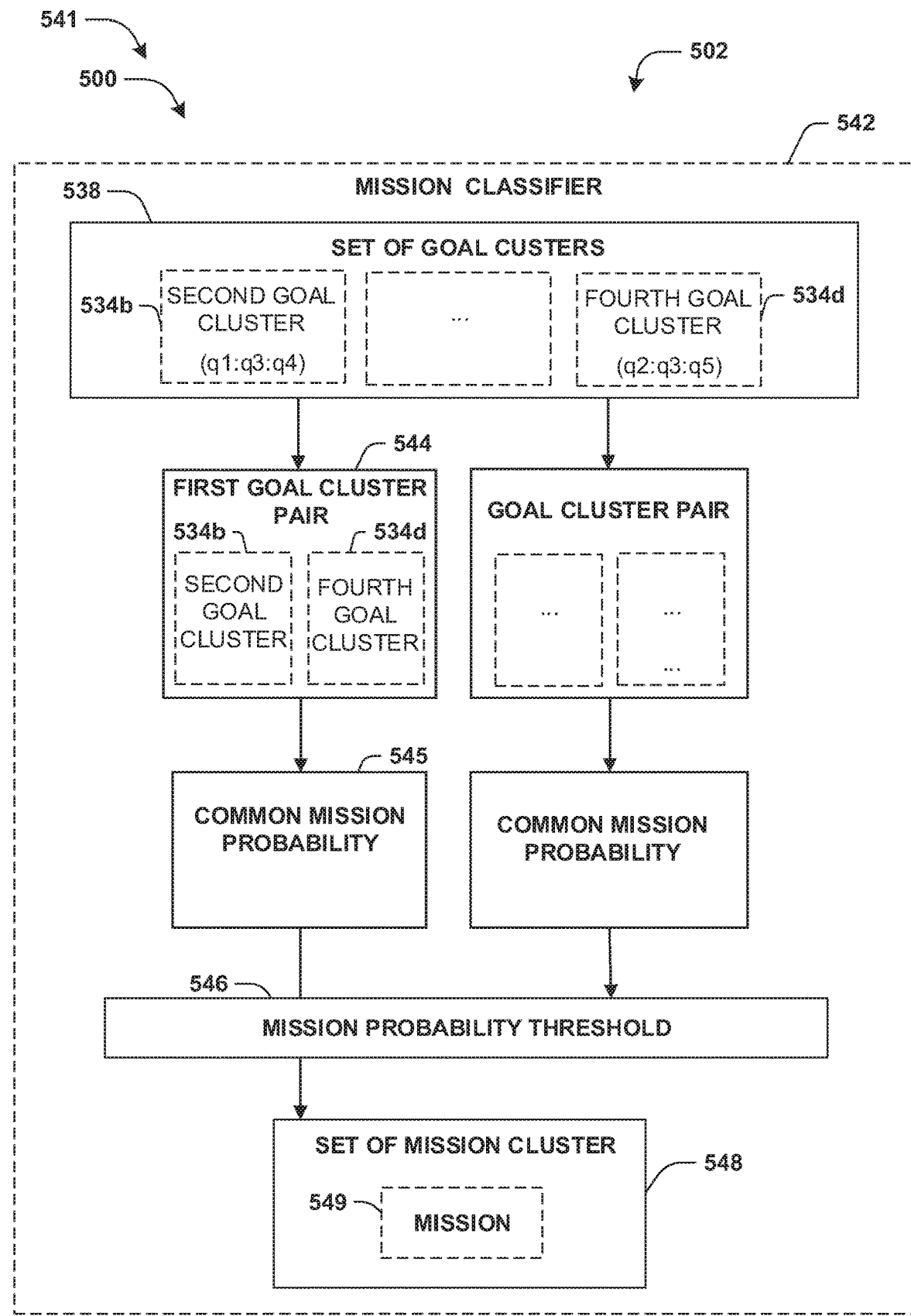
FIG. 5D is a component block diagram illustrating an example system for generating a query-goal-mission structure, wherein a set of mission clusters are identified.

FIG. 5D illustrates an example 541 where a set of mission clusters 548 may be identified for the set of goal clusters 528. In an example, the clustering component 502 may utilize a mission classifier 542 to group the goal clusters within the set of goal clusters 528 into goal cluster pairs, such as a first goal cluster pair 544. The clustering component 502 may utilize the mission classifier 542 to determine a common mission probability 545 for the first goal cluster 544. Responsive to the common mission probability 545 exceeding a mission probability threshold 546, the first goal cluster pair 544 may be identified as a mission cluster 549. In an example, additional goal clusters may be grouped with the goal cluster pair having a largest common mission probability (not illustrated). In this way, additional missions may be identified and subsequently grouped into the set of mission clusters 548.

Figure 5E:
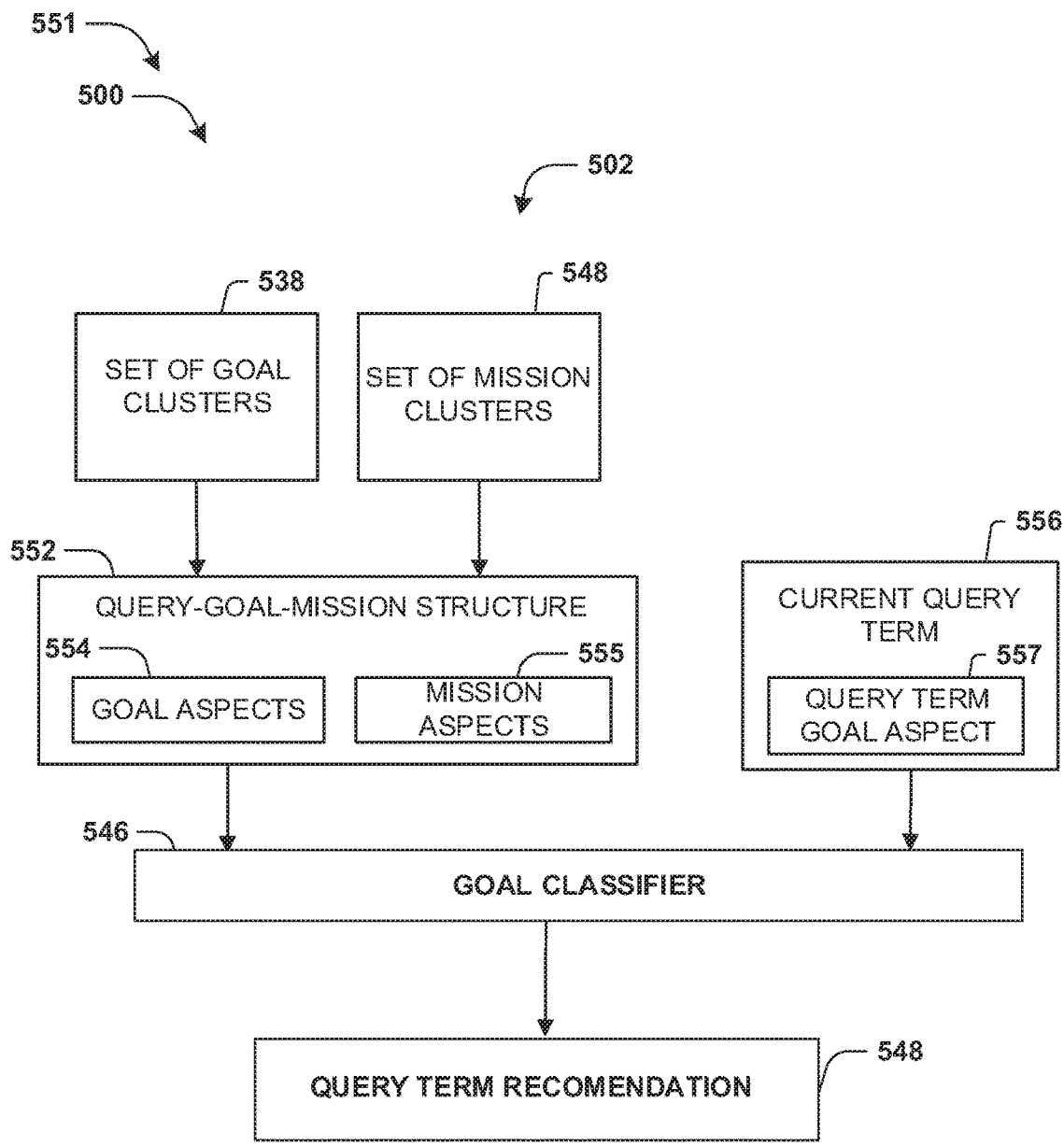
FIG. 5E is a component block diagram illustrating an example system for generating a query-goal-mission structure, where a query recommendation is identified by the query-goal-mission structure.

FIG. 5E illustrates an example 551 where a query-goal-mission structure 552 is generated based upon the set of goal clusters 528 and the set of mission clusters 548. In an example, the query-goal-mission structure 552 may include aspects 554-555 associated with the set of goal clusters 528 and the set of mission clusters 548 (e.g., query information for the queries within the set of goal clusters 528 and the set of mission clusters 548, such as query terms, feature weights, feature values, etc.). Responsive to a current query term 556 being submitted to a search engine (not illustrated), the current query term 556 may be evaluated to identify a current query term aspect, such as a current query term goal aspect 557. Responsive to the goal classifier 503 determining that the current query term goal aspect 557 corresponds to a goal aspect 554 of the query-goal-mission structure 552, the query-goal-mission structure 552 may be utilized to identify a query term recommendation 559.

Figure 6A:
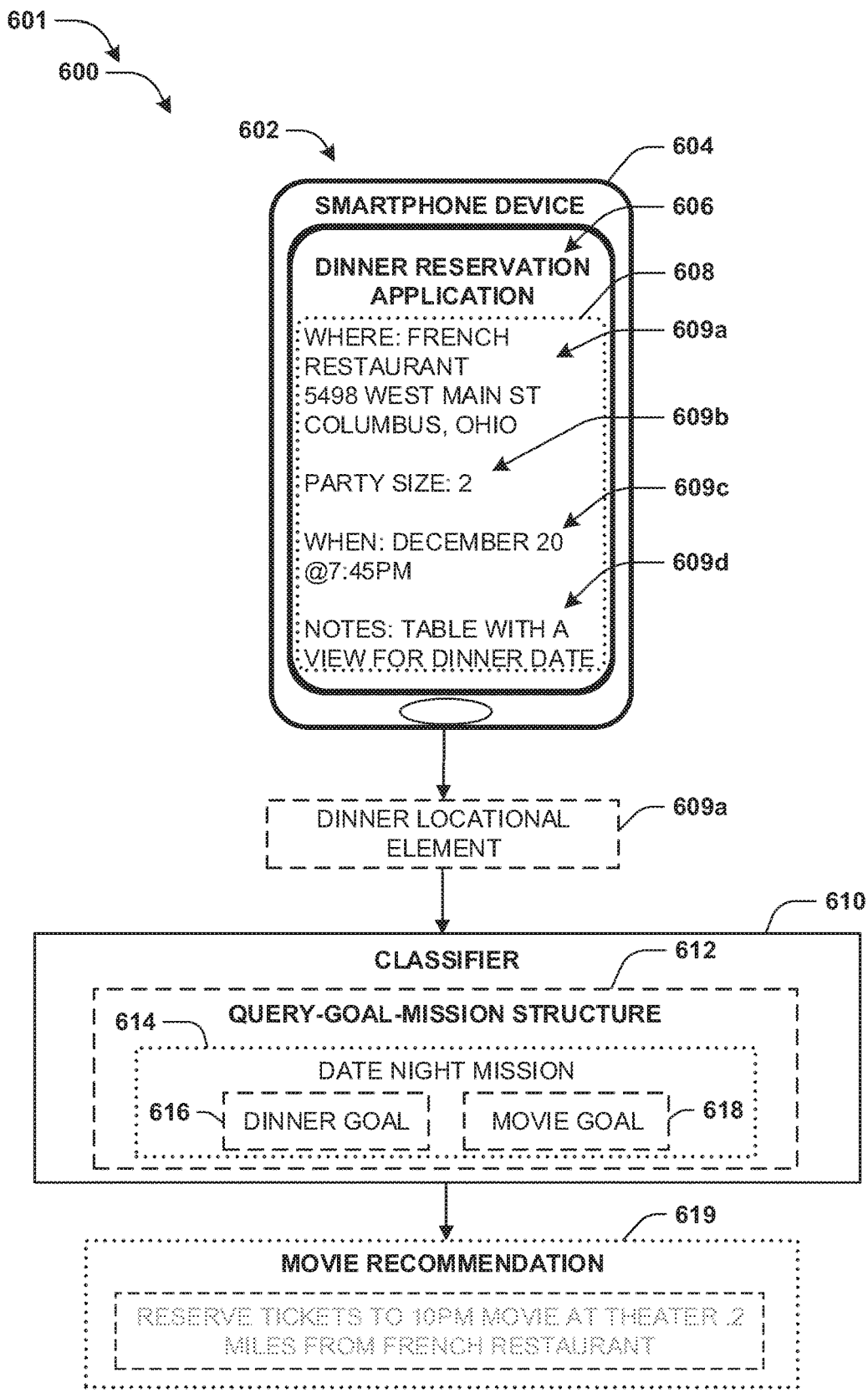
FIG. 6A is a component block diagram illustrating an example system for providing a recommendation to a user, where a secondary goal is identified.
Figure 6B:
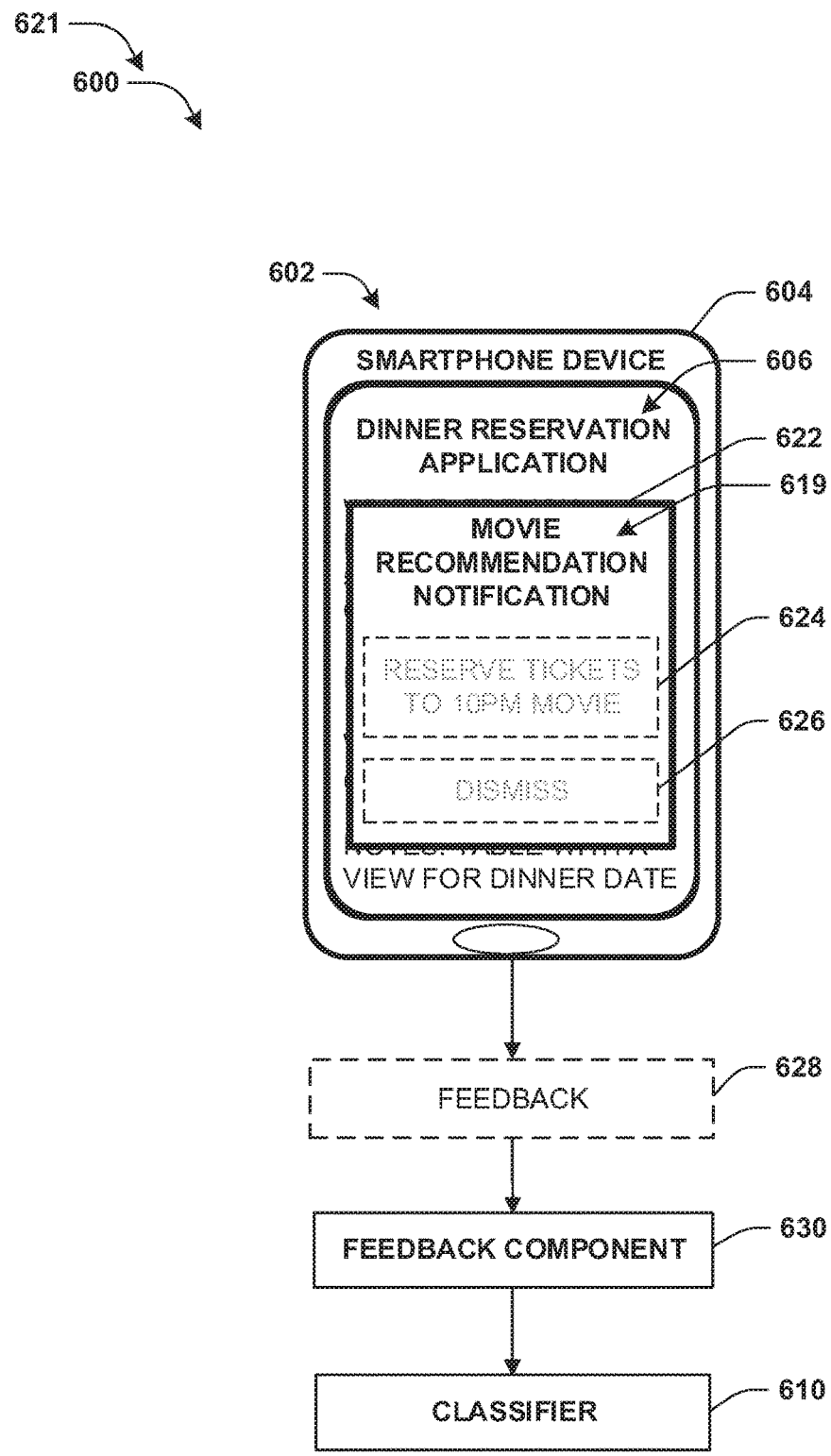
FIG. 6B is a component block diagram illustrating an example system for providing a recommendation to a user, where a recommendation is displayed by a popup notification and feedback associated with the recommendation is provided to a feedback component for training a classifier.

FIG. 6A-6B illustrate examples of a system 600 where a clustering component 602 utilizes a query-goal-mission structure 612 to provide a movie recommendation 620 on a smartphone device 604. FIG. 6A illustrates an example 601 of a user (not illustrated) performing a user interaction, such as inputting reservation information 608 into a dinner reservation application 606 displayed by the smartphone device 604. The reservation information 608 may comprise a dinner locational element 609a, a dinner attendee element 609b (e.g., party size, list of attendee's, etc.), a dinner event time element 609c, a personal information element 609d, and/or the like. The clustering component 602 may be configured to utilize classifier 610 (e.g., goal classifier, mission classifier, hybrid classifier, etc.) to evaluate the one or more elements of the reservation information 608, such as the dinner locational element 609a. The classifier 610 may determine that the dinner locational element 609a (e.g., restaurant name, address, etc.) corresponds to a dinner goal 616. Responsive to determining the dinner locational element 609a corresponds to the dinner goal 616, the clustering component 602 may utilize the query-goal-mission structure 612 to identify a secondary goal of the user, such as a movie goal 618, which is associated with the dinner goal 616. The movie goal 618 may be identified based upon the movie goal 618 and the dinner goal 616 corresponding to the same mission, such as a date night mission 614. Responsive to identifying the movie goal 618 as the secondary goal for the user, a movie recommendation 619 may be identified. In an example, a search engine (not illustrated) may be utilized to identify movie theaters and/or movie show times near the restaurant and/or the user.

FIG. 6B illustrates an example 621 of the system 600 where the movie recommendation 619 is displayed in a popup notification 622 on the smartphone device 604 by the clustering component 602. The popup notification 622 may be actively display over the dinner reservation application 606 to provide the user with the movie recommendation 619 in real-time. The popup notification 622 may comprise user interface elements, such as a movie ticket reservation user interface element 624 and a dismissal user interface element 626 (e.g., selection of the movie ticket reservation user interface element 624 may launch a ticket purchasing application where the user may purchase of the movie tickets). Responsive to the user selecting the movie ticket reservation user interface element 624 and/or the dismissal user interface element 626, feedback 628 corresponding to the selection of the user may be provide to a feedback component 630. The feedback 628 may be indicative of whether the user found the movie recommendation 619 relevant (e.g., user satisfaction with recommendations provided may be monitored). The feedback component 630 may be utilized to train the classifier 610 based upon the feedback 628 provided by the user. In this way, the user experience of the user may be monitored and subsequently improved.

Figure 7:
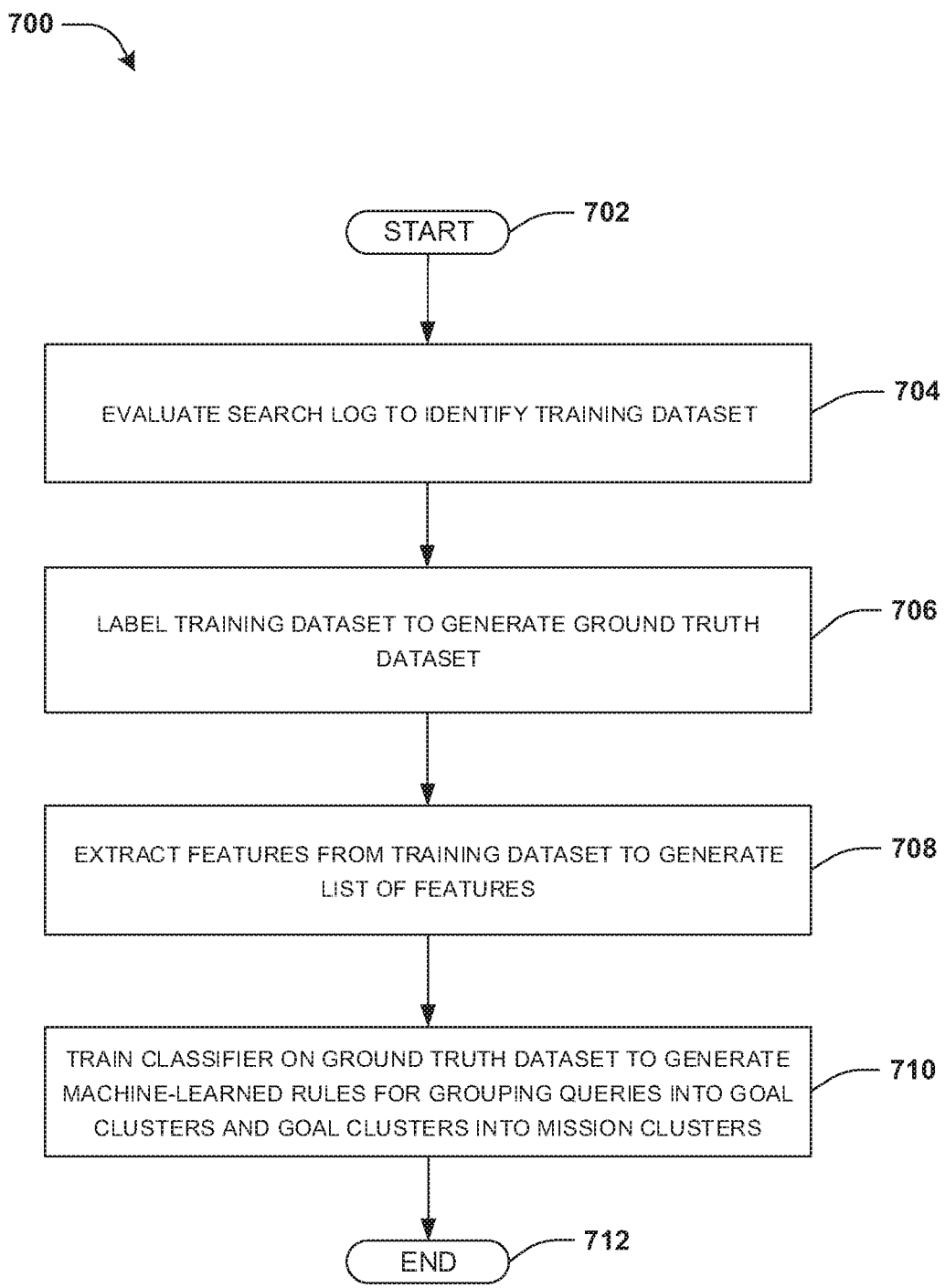
FIG. 7 is a flow chart illustrating an example method for training a classifier.

An embodiment of training a classifier is illustrated by an example method 700 of FIG. 7. At 702, the method 700 starts. At 704, a search log may be evaluated to identify a training dataset. The training dataset may include a set of query pairs and, for each query pair, a set of features. The set of query pairs may be identified from the search log, which may be indicative of search interactions between users and a search engine. In an example, search data, such as a Bcookie, a TSID, and/or a timestamp, within the training dataset may be identified for the set of query pairs. In an example, the training dataset may comprise a large-scale query dataset of queries received over a set period of time (e.g., months, years, etc.).

At 706, the training dataset may be labelled to generate a ground truth dataset. In an example, a human operator (e.g., an annotator) may label the training dataset. For example, the human operator may label the query pairs and/or the set of features associated with the query pairs. The human operator may utilize search data from the search log to label the training dataset. In another example, the human operator may provide an expected classification for the query pairs (e.g., the human operator may identify a query pair as being associated with a first goal and a first mission).

At 708, features may be extracted from the training dataset to generate a list of features. In an example, the list of features may be extracted for each query pair along with a corresponding timestamp. The features may comprise query content local features, query-pair global features, query term-pair global features, and/or desktop query term-pair features.

At 710, a classifier may be trained on the ground truth dataset to generate machine-learned rules for grouping (e.g., classifying) queries into goal clusters and/or goal clusters into mission clusters. The classifier may comprise a goal classifier, a mission classifier, and/or a hybrid classifier. The hybrid classifier may classify queries into goals and missions (e.g., a combination of the functionality of both the goal classifier and the mission classifier). In an example, the classifier may be trained by a supervised learning method and/or an unsupervised learning method. The machine-learned rules may be determined from a boosted decision tree, an ensemble, a linear regression, a neural network, a BIRCH clustering, a k-means, and/or the like. The classifier may utilize the ground truth dataset to generate a model and/or an algorithm to determine an association of the query pair with a goal and/or a mission (e.g., the classifier may group the query pairs into goal clusters and mission clusters as discussed above with regard to method 400). In an example, the machine-learned rules may be tuned based upon a performance level of the classifier. User feedback indicative of an incorrect goal and/or mission being identified may be utilized to tune the classifier. In this way, the performance of the classifier may be improved to better identify goals and/or missions associated with the search sequence provide by a user.

In an example, the classifier may determine a feature weight for the features within the list of features from the training dataset. The feature weight may be determined during the training of the classifier. For example, responsive to the classifier determining that a first feature is particularly relevant for the classification of the query pairs, the feature weight for the first feature may be increased (e.g., the first feature may have a greater impact on the model). At 712, the method 700 ends.

Figure 8:
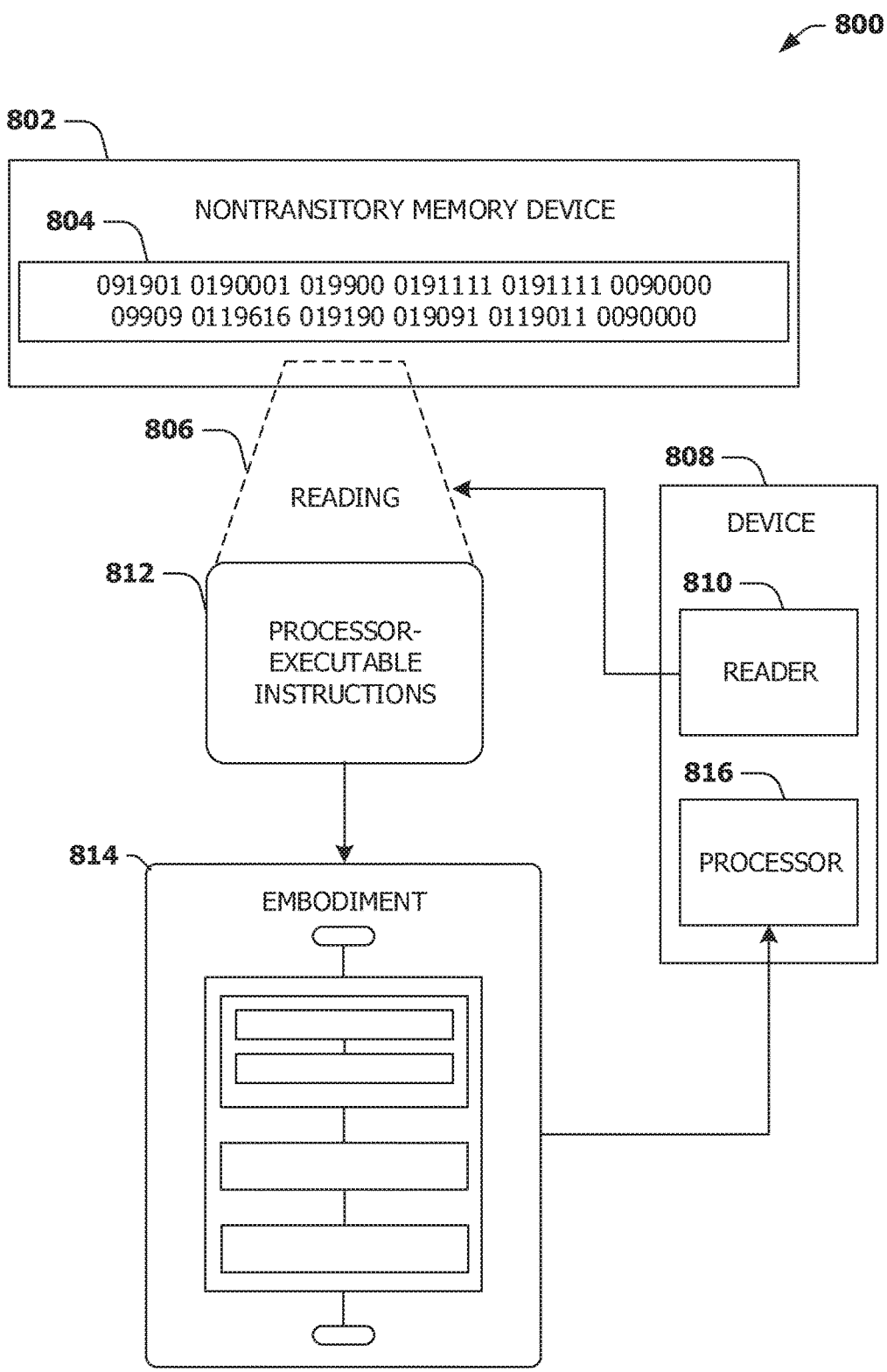
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 400 of FIG. 4 and/or at least some of the example method 700 of FIG. 7, for example. In some embodiments, the processor-executable instructions, when executed on the processor 816 of the device 808, are configured to implement a system, such as at least some of the example system 500 of FIGS. 5A-5E and/or at least some of example system 600 of FIGS. 6A-6B, for example.

3. Usage of Terms

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
evaluating a set of queries to identify query information for queries within the set of queries;
evaluating the queries as query pairs utilizing a goal classifier to determine common goal probabilities for the query pairs based upon the query information;
grouping one or more query pairs associated with one or more common goal probabilities exceeding a goal probability threshold into a plurality of goal clusters;
evaluating the plurality of goal clusters as goal cluster pairs utilizing a mission classifier to determine common mission probabilities for the goal cluster pairs, wherein the plurality of goal clusters comprises at least a first goal cluster comprising two or more first query pairs and a second goal cluster comprising two or more second query pairs;
grouping the first goal cluster and the second goal cluster, of a first goal cluster pair of the goal cluster pairs, into a first mission cluster based upon a first common mission probability, for the first goal cluster pair, exceeding a mission probability threshold, wherein the first mission cluster is associated with four or more query pairs, wherein the first common mission probability for the first goal cluster pair is indicative of the first goal cluster and the second goal cluster corresponding to a first common mission; and
generating a query-goal-mission structure for the set of queries based upon the plurality of goal clusters and the first mission cluster, at least some of the method implemented via a processor,
wherein at least one of:
the first common mission probability is based upon a number of queries in at least one of the first goal cluster or the second goal cluster; or
at least one common goal probability, of the one or more common goal probabilities associated with the one or more query pairs grouped into the plurality of goal clusters, is based upon a number of queries in the set of queries.

2. The method of claim 1, comprising:
determining the first common mission probability based upon the number of queries in at least one of the first goal cluster or the second goal cluster.

3. The method of claim 1, comprising:
determining user satisfaction with a search utilizing the query-goal-mission structure.

4. The method of claim 1, the evaluating the queries as query pairs comprising:
evaluating the query information to determine features for the query pairs; and
comparing the features to determine the common goal probabilities for the query pairs.

5. The method of claim 4, the features comprising at least one of:
a query-pair local feature, a query-pair global feature, a query term-pair global feature, or a desktop query term-pair feature.

6. The method of claim 1, comprising:
determining the first common mission probability based upon one or more times between queries in at least one of the first goal cluster or the second goal cluster.

7. The method of claim 1, comprising:
optimizing a search ranking model utilizing the query-goal-mission structure.

8. The method of claim 1,
the evaluating the queries as query pairs comprising:
identifying a first set of features for the query pairs; and
utilizing the first set of features to determine the common goal probabilities for the query pairs; and
the evaluating the plurality of goal clusters comprising:
identifying a second set of features for the goal cluster pairs; and
utilizing the second set of features to determine the common mission probabilities for the goal cluster pairs, where the first set of features is different than the second set of features.

9. The method of claim 4, the goal classifier comprising a linear model with Akaike Information Criterion (AIC), and the evaluating the query information to determine features for the query pairs comprising:
evaluating the query information for the query pairs utilizing the goal classifier to determine an aspect for the query pairs; and
select a first feature, but not a second feature, based upon the aspect.

10. The method of claim 1, the query information being indicative of a data sparseness concern, and the method comprising:
identifying the set of queries from a mobile search log;
evaluating the query information associated with the plurality of goal clusters to identify data sparseness; and
utilizing a desktop query term pair global feature to determine a common mission probability.

11. The method of claim 1, the evaluating the queries comprising:
evaluating the query information to identify a number of long tail queries; and
responsive to the number of long tail queries exceeding a long tail query threshold, utilizing a query term pair global feature, but not a query pair global feature, to determine the common goal probabilities from the query information.

12. The method of claim 1, wherein the set of queries contains queries associated with a cross-device search session.

13. The method of claim 1, comprising:
training the goal classifier and the mission classifier to generate machine-learned rules for query classification, the training comprising:
evaluating a search log to identify a training dataset;
labeling the training dataset to generate a ground truth dataset;
extracting features from the training dataset to generate a list of features; and
training at least one of the goal classifier or the mission classifier on the ground truth dataset to generate machine-learned rules for grouping queries into goal clusters and goal clusters into mission clusters.

14. The method of claim 1, comprising:
ranking search results utilizing the query-goal-mission structure.

15. A system, comprising:

a processor; and memory comprising instructions that when executed by the processor implement a clustering component configured to:

evaluate a set of queries to identify query information for queries within the set of queries;

group one or more query pairs associated with common goal probabilities exceeding a goal probability threshold into a plurality of goal clusters, wherein at least one common goal probability, of the common goal probabilities associated with the one or more query pairs grouped into the plurality of goal clusters, is based upon a number of queries in the set of queries associated with the one or more query pairs;

evaluate the plurality of goal clusters as goal cluster pairs utilizing a mission classifier to determine common mission probabilities for the goal cluster pairs, wherein the plurality of goal clusters comprises at least a first goal cluster and a second goal cluster;

group the first goal cluster and the second goal cluster, of a first goal cluster pair of the goal cluster pairs, into a first mission cluster based upon a first common mission probability, for the first goal cluster pair, exceeding a mission probability threshold, wherein the first mission cluster is associated with four or more query pairs, wherein the first common mission probability for the first goal cluster pair is indicative of the first goal cluster and the second goal cluster corresponding to a first common mission; and generate a query-goal-mission structure for the set of queries based upon the plurality of goal clusters and the first mission cluster.

16. The system of claim 15, the clustering component configured to:

use the query-goal-mission structure to identify a query recommendation; and transmit the query recommendation to a remote device.

17. The system of claim 15, the clustering component configured to:

retrieve a number of search results based upon a search query, wherein the at least one common goal probability is based upon the number of search results.

18. The system of claim 15, comprising:

a search assistance component configured to at least one of:

identify an event recommendation based upon the query-goal-mission structure;

identify content associated with a product or service based upon the query-goal-mission structure; or rank search results based upon the query-goal-mission structure.

19. A non-transitory computer readable medium comprising computer executable instructions that when executed by a processor perform a method, comprising:

grouping one or more query pairs associated with common goal probabilities exceeding a goal probability threshold into a plurality of goal clusters;

evaluating the plurality of goal clusters as goal cluster pairs utilizing a mission classifier to determine common mission probabilities for the goal cluster pairs;

grouping the goal cluster pairs into mission clusters based upon the common mission probabilities for the goal cluster pairs exceeding a mission probability threshold, wherein a first common mission probability, of the common mission probabilities, is indicative of two or more goal clusters of a first goal cluster pair, of the goal cluster pairs, corresponding to a first common mission, wherein the first common mission probability is based upon a number of queries in at least one goal cluster of the first goal cluster pair;

generating a query-goal-mission structure based upon the plurality of goal clusters and the mission clusters; and using the query-goal-mission structure to identify a query recommendation.

20. The non-transitory computer readable medium of claim 19, the method comprising:

transmitting the query recommendation to a remote device.

* * * * *